(12) United States Patent
Zlatarev et al.

(10) Patent No.: US 10,789,158 B2
(45) Date of Patent: Sep. 29, 2020

(54) ADAPTIVE MONITORING OF APPLICATIONS

(71) Applicant: SAP SE

(72) Inventors: Stephan Zlatarev, Sofia (BG); Dimitar Valov, Sofia (BG)

(73) Assignee: SAP SE, Walldorf (DE)

( * ) Notice: Subject to any disclaimer, the term of this patent is extended or adjusted under 35 U.S.C. 154(b) by 118 days.

(21) Appl. No.: 15/927,727

(22) Filed: Mar. 21, 2018

(65) Prior Publication Data
US 2019/0294538 A1 Sep. 26, 2019

(51) Int. Cl.
*G06F 11/00* (2006.01)
*G06F 11/36* (2006.01)
*G06N 3/08* (2006.01)
*G06N 3/04* (2006.01)
*G06F 11/30* (2006.01)
*G06F 11/34* (2006.01)

(52) U.S. Cl.
CPC ........ *G06F 11/3692* (2013.01); *G06F 11/302* (2013.01); *G06F 11/3089* (2013.01); *G06F 11/3495* (2013.01); *G06F 11/3684* (2013.01); *G06F 11/3688* (2013.01); *G06N 3/04* (2013.01); *G06N 3/08* (2013.01)

(58) Field of Classification Search
CPC ............... G06F 11/3692; G06F 11/302; G06F 11/3089; G06F 11/3495; G06F 11/3684; G06F 11/3688; G06F 11/3058; G06N 3/04; G06N 3/08
See application file for complete search history.

(56) References Cited

U.S. PATENT DOCUMENTS

| | | | |
|---|---|---|---|
| 2016/0104076 A1* | 4/2016 | Maheshwari | G06N 20/00 706/12 |
| 2017/0220407 A1* | 8/2017 | Estrada | G06F 11/0751 |
| 2018/0287907 A1* | 10/2018 | Kulshreshtha | G06F 11/3495 |
| 2018/0373617 A1* | 12/2018 | Gaier | G06F 11/3612 |

* cited by examiner

*Primary Examiner* — Joseph D Manoskey
(74) *Attorney, Agent, or Firm* — Buckley, Maschoff & Talwalkar LLC (57) ABSTRACT

Capability information for a sensor agent is received. The capability information includes one or more metrics that the sensor agent is configured to provide. The sensor agent is configured in accordance with an initial configuration including a first level of granularity for test data. When the test data is received from the sensor agent, a value of at least one metric from the one or more metrics is tested in a machine learning module. The value is classified based on an output from the machine learning module. The initial configuration of the sensor agent is automatically adjusted to adaptively define a second level of granularity for the test data provided by the sensor agent.

20 Claims, 8 Drawing Sheets

ADAPTIVE MONITORING OF APPLICATIONS

BACKGROUND

Application performance monitoring (APM) is typically performed by software tools integrated with applications to measure key performance indicators (KPIs) for the applications. The KPIs include system metrics such as central processing unit (CPU) temperature, CPU usage, transaction time, transaction load, network traffic, etc. The system metrics are presented graphically in diagrams and statistic views, thus enabling assessment of the applications' condition. APM tools automatically discover topology of distributed systems and provide end-to-end tracing of transactions.

However, efficiency and out-of-the-box functionality of APM tools depend on application type and technology. For example, some APM tools may readily connect to applications written in Java® programming language, while other may be configured to work with systems written in C++. Further, APM tools may provide different level of expertise depending on types of system metrics, e.g., one APM tool may be more suitable for processing hardware metrics, while another APM tool may deliver better performance when interpreting and displaying issues based on software metrics. Thus, effective monitoring of heterogeneous landscapes often requires deployment of several APM tools.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for adaptive monitoring of applications are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily referring to the same embodiment. Furthermore, the particular features, structures, or characteristics may be combined in any suitable manner in one or more embodiments.

Figure 1:
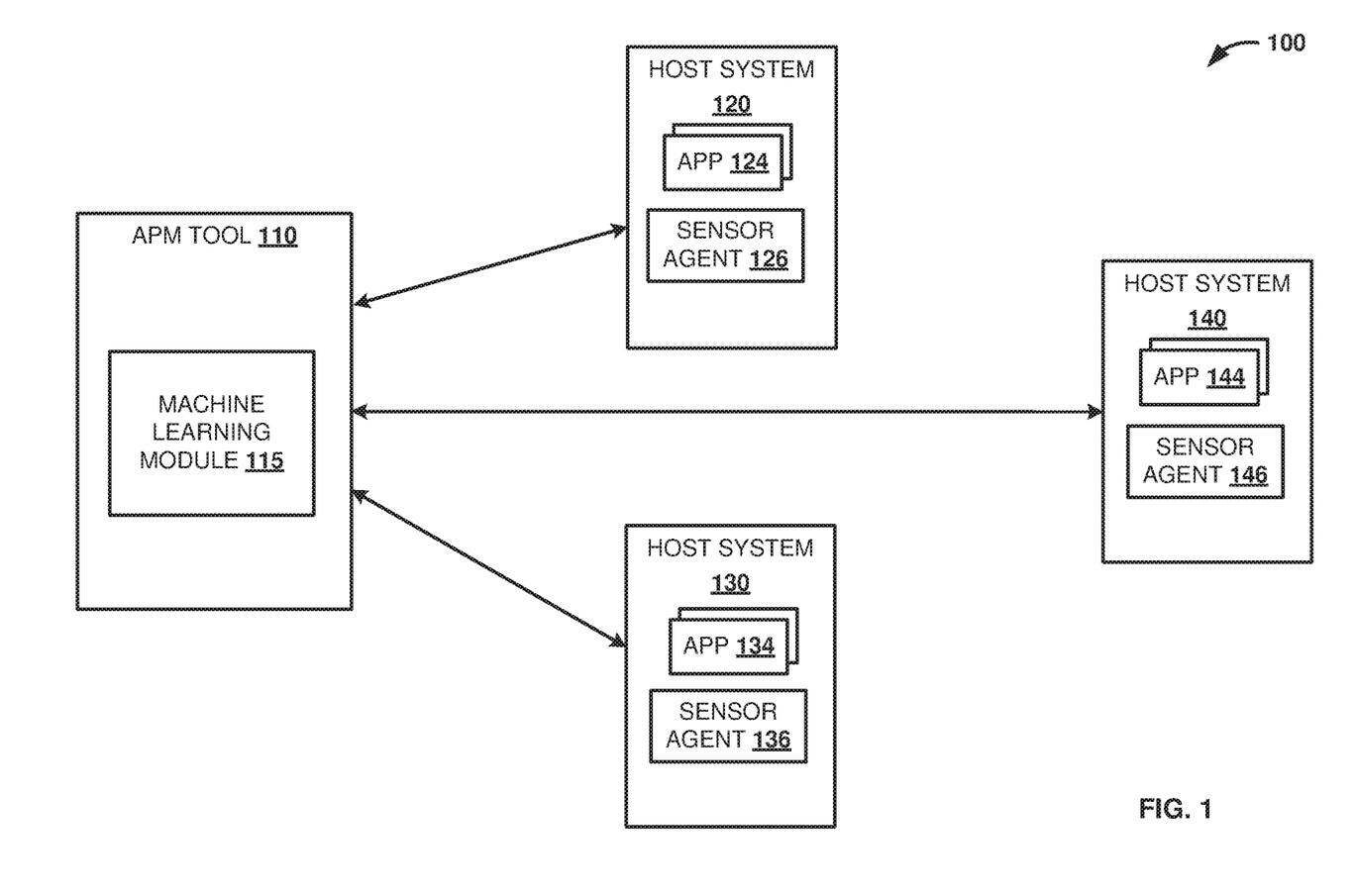
FIG. 1 is a block diagram illustrating a system landscape including an application performance monitoring (APM) tool and a number of applications, according to one embodiment.

FIG. 1 illustrates system landscape 100 to monitor application performance, according to one embodiment. The system landscape 100 includes application performance monitoring (APM) tool 110. The APM tool 110 is configured to monitor performance of applications within the system landscape 100. The APM tool 110 automatically discovers topology of the system landscape 100 and establishes connections with systems in the system landscape 100.

In one embodiment, the APM tool 110 collects performance data from applications running on host systems 120, 130, and 140. A host system is a system that provides environment for deploying and running software. The software may include tools and applications that provide services to users or other systems through a computer network (not illustrated). The host systems 120, 130, and 140 may include on-premise and/or cloud based systems. The host systems 120, 130, and 140 are connected to a restricted network such as an intranet of an organization. The host systems may also include third party systems connected to an open access network such as the Internet. For example, a host system may be a server, a personal computer, a tablet, a smart phone, etc. Alternatively, a host system may be a host operating system that provides environment for installing one or more virtual operating systems within the host operating system. The environment may enable the virtual operating systems to function simultaneously. The host operating system may run on a shared hardware platform independent of other host operating systems that may be deployed on the hardware platform.

In one embodiment, the host systems 120, 130, and 140 include sensor agents 126, 136, and 146. A sensor agent is responsible for collection of system metrics from a corresponding host system and for establishing a connection between the corresponding host system and a monitoring tool such as the APM tool 110. APM tools communicate with host systems via sensor agents that are installed on the host systems. For example, the APM tool 110 communicates with host system 120 via sensor agent 126 that is installed on the host system 120. Similarly, the APM tool 110 communicates with the host system 130 via sensor agent 136 and with the host system 140 via sensor agent 146.

In one embodiment, development of the APM tool 110 is decoupled from development of the sensor agents 126, 136, and 146. For example, the APM tool 110 may be developed by a vendor of application monitoring solutions. In contrast, the sensor agents 126, 136, and 146 may be developed by a cloud provider that partners with the vendor of application monitoring solutions to provide application performance monitoring as a cloud service to customers. Since the APM tool 110 and the sensor agents 126, 136, and 146 are developed by different entities, the APM tool 110 may not be preconfigured to readily connect and work with the sensor agents 126, 136, and 146.

In one embodiment, the APM tool 110 automatically integrates with the sensor agents 126, 136, and 146. The APM tool 110 requests capability information from the sensor agents deployed in the system landscape 100. The APM tool 110 may send requests for capability information to network addresses (not illustrated) associated with the sensor agents 126, 136, and 146. For example, the APM tool 110 may send requests to uniform resource identifiers (URIs) associated with the sensor agents 126, 136, and 146. The network addresses may be preconfigured in the APM tool 110. Alternatively, the sensor agents 126, 136, and 146 may register with the APM tool 110 when deployed within the host systems 120, 130, and 140. This way, the APM tool 110 may create a number of associations between endpoints and corresponding sensor agents 126, 136, and 146.

In one embodiment, the capability information includes types of system metrics that the sensor agents 126, 136, and 146 are configured to provide. Examples for types of system metric include web requests or transactions performance metrics, metrics for usage and performance of application dependencies such as databases, web services metrics, caching metrics, metrics for detailed transaction traces including lines of source code, metrics for code level performance profiling, basic server metrics for central processing unit (CPU), memory, etc., metrics for application frameworks, application log data metrics, application errors metrics, and so on.

In one embodiment, the capability information includes a highest granularity level for the system metrics. The highest level of granularity determines an ultimate level of detail that may be captured for a system metric. For example, a highest granularity level of zero point one (0.1) degrees Celsius for a "CPU temperature" metric determines that the ultimate level of detail to be provided for this system metric equals one tenth of a Celsius degree. Alternatively, the highest granularity level may define an interval of time between receiving a first value for the system metric and receiving a second value for the system metric. For example, highest granularity level of one (1) second for the "CPU temperature" metric determines that values for the system metric may be received at a maximum frequency rate of 1 second.

In one embodiment, the capability information is preconfigured in the sensor agents 126, 136, and 146. The capability information is based on types of sensors attached to the sensor agent at a corresponding host system. For example, the sensor agent 126 may communicate with a hardware sensor (not illustrated) that measures CPU temperature in the host system 120. Thus, the capability information for the sensor agent 126 is configured to include a "CPU temperature" metric and a corresponding highest granularity level for the "CPU temperature" metric. A sensor agent may communicate with a number of hardware and/or software sensors deployed in a corresponding host system. In various embodiments, the capability information in the sensor agents may be automatically generated based on type and precision of sensors that are deployed in the host systems. Further, the capability information of a sensor agent may be automatically updated when an additional sensor is deployed in the corresponding host system. In one embodiment, the hardware sensors provide performance metrics associated with the host system and the software sensors measure performance of applications hosted by the host system.

In one embodiment, the APM tool 110 generates configuration of the sensor agents 126, 136, and 146, based on the capability information for the sensor agents 126, 136, and 146. For example, the capability information for the sensor agent 126 may include a "CPU temperature" metric, a "web requests" metric, and corresponding highest granularities (e.g., "0.1 degree Celsius" for the "CPU temperature" metric and "is" for the "web requests" metric—indicating a number of web requests processed for 1 second) that the sensor agent 126 is capable of providing. Based on the capability information, the APM tool 110 may generate a configuration for the sensor agent 126. The configuration includes one or more metrics from the capability information and a corresponding granularity level for the one or more metrics. For example, the configuration for the sensor agent 126 may include the "CPU temperature" metric and a corresponding granularity level of "0.5 degree Celsius". The APM tool 110 automatically generates and sends configurations to the sensor agents 126, 136, and 146 based on the received capability information.

In one embodiment, the APM tool 110 includes machine learning module 115. The machine learning module 115 is configured to automatically test values of system metrics that are received at the APM tool 110. The machine learning module 115 tests a value to determine whether the value is within (or outside of) a predefined range of values for the corresponding system metric. The machine learning module may operate in training mode or in test mode. When operating in training mode, the machine learning module 115 automatically determines the range of values. The range of values is determined based on monitoring data that include a number of values for one or more system metrics. The monitoring data are received while the machine learning module 115 operates in training mode. The monitoring data may be received from one or more sensor agents connected with the APM tool 110. Monitoring data received while the machine learning module 115 operates in training mode may be referred to as training data.

In one embodiment, the machine learning module 115 operates in training mode for a predefined interval of time. The machine learning module 115 monitors host systems 120, 130, and 140 and accumulates training data. The machine learning module 115 evaluates the training data and automatically determines variations of values for a system metric. Based on the variations, the machine learning module defines a range of values for the system metric. The machine learning module 115 may determine a number of value ranges for a number of system metrics provided by a sensor agent. The number of system metrics may correspond to capabilities of sensors deployed in a respective host system from the number of host systems in the system landscape 100. In addition, the machine learning module 115 is configured to define one or more layers of values within the determined range of values. For example, the layers of values may represent values that are close to the min/max values of the range of values or values that are close to an average value calculated based on the values in the range of values.

In one embodiment, the machine learning module 115 switches to test mode when the predefined interval of time for the training mode expires. In test mode, the machine learning module 115 compares newly received values for the system metric with the value ranges determined during the training mode. Based on the comparison, the machine learning module 115 determines whether a newly received value for the system metric falls within the determined range of values for the system metric. In addition, the machine learning module 115 may determine whether the newly received value for the system metric is closer to the min/max value of the range of values or closer to the average value based on the layers within the range of values. The machine learning module 115 provides an output of the comparison to the APM tool 110. The output may include a notification that the newly received value for the system metric is outside of or within the range of values. When the newly received value is within the range of values, the output from the machine learning module 115 may also define a layer of values that includes the newly received value of the system metric.

In one embodiment, the APM tool 110 is configured to classify the newly received value based on the output from the machine learning module 115. For example, the APM tool 110 classifies the newly received value as "abnormal", when the output from the machine learning module 115 declares that the newly received value is outside the range of values; or the APM tool 110 classifies the received value as "routine" when the output from the machine learning module 115 declares that the newly received value is within the range of values and further falls within a layer of values closer to the average value. Further, the APM tool 110 is configured to classify the newly received value as "suspicious" when the output from the machine learning module 115 declares that the newly received value is within the range of values and further falls within a layer of values closer to the min/max values of the range of values.

In one embodiment, the APM tool 110 automatically requests additional test data when the newly received value is classified as "suspicious". For example, when the sensor agent 126 initially provides test data with a first level of granularity, the APM tool 110 automatically adjusts the first level of granularity to adapt the configuration of the sensor agent 126 to the test data. Adjustment of the configuration of the sensor agent 126 is performed by the APM tool 110 automatically and without manual intervention. Preconfiguring the sensor agents to provide test data with different level of granularity improves accuracy of predictions of abnormal conditions and provides greater level of insight in end-to-end tracing of errors among heterogeneous systems. The process of preconfiguring the sensor agents will be described in detail below with reference to FIG. 3 and FIG. 6.

Figure 2:
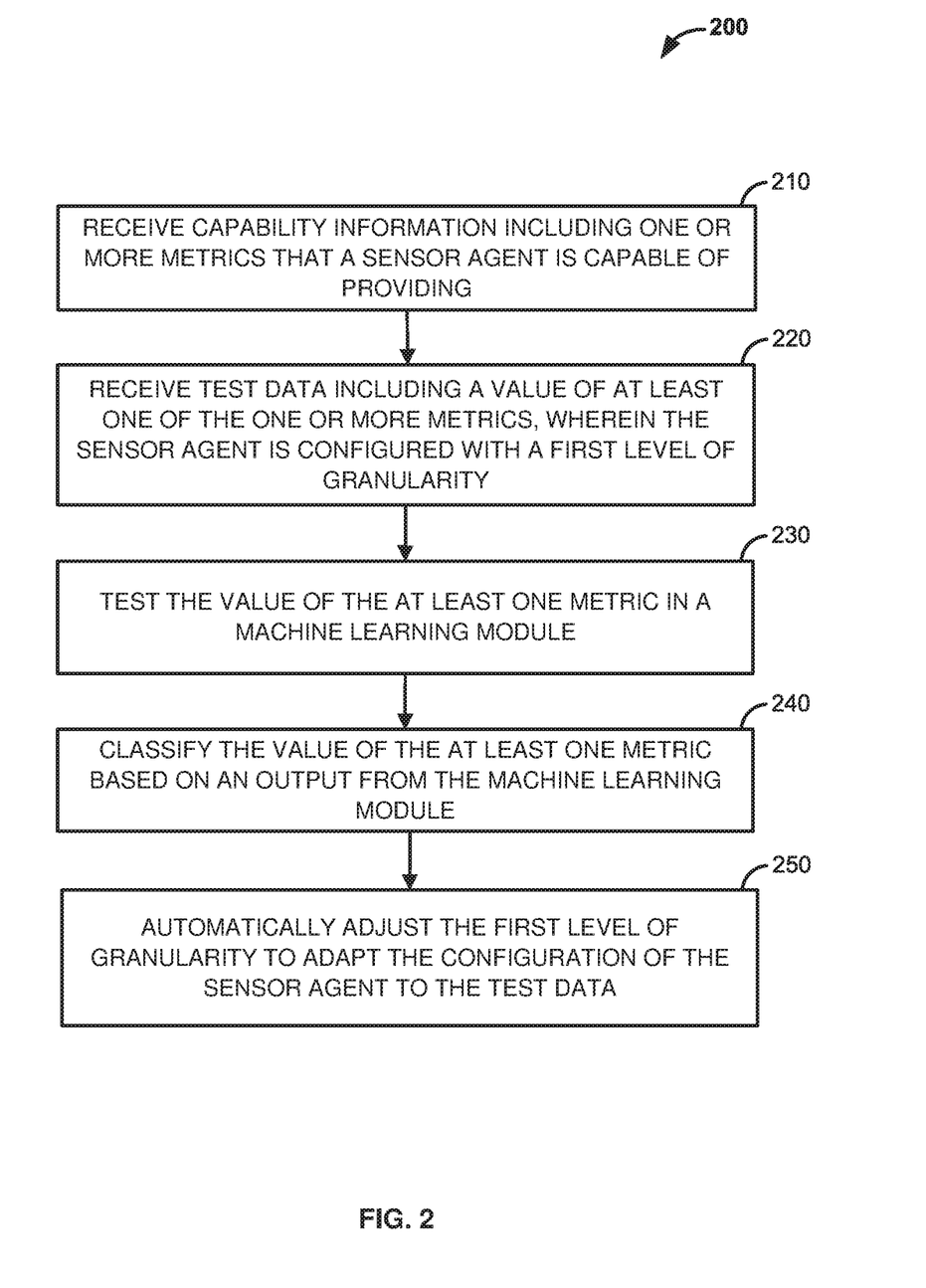
FIG. 2 is a flow diagram illustrating a process to adaptively configure a sensor agent, according to one embodiment.

FIG. 2 illustrates a process 200 to adaptively configure a sensor agent, according to one embodiment. At 210, capability information for a sensor agent is received. For example, the capability information may be received at the APM tool 110, FIG. 1. The capability information includes one or more metrics that the sensor agent is capable of providing. In addition, the capability information includes a highest granularity level for the one or more metrics. At 220, test data are received. The test data include a value of at least one metric of the one or more metrics. In addition, the test data are provided in accordance with a configuration of the sensor agent. In one embodiment, the configuration of the sensor agent includes a first level of granularity for the test data.

At 230, the value of the at least one metric is tested in a machine learning module. For example, the value may be tested in machine learning module 115, FIG. 1. The value may be tested in accordance with a model structure defined by the machine learning module based on training data. Based on the test, an output is provided by the machine learning module. For example, the output from the machine learning module may declare that the value is within or outside of a predefined range of values for the system metric.

At 240, the value of the at least one metric is classified based on the output from the machine learning module. For example, when the output declares that the value is outside of the predefined range of values for the system metric, the value may be classified as "abnormal". Similarly, when the output from the machine learning module declares that the value is within the range of values, the value may be classified as "routine". Based on the classification, condition of a host system (or an application running on the host system) may be determined.

In one embodiment, the output of the machine learning module declares that the value is within the range of values, but is close to the min/max value from the range of values. Thus, the value is classified as "suspicious". When the value is classified as "suspicious", at 250, the first level of granularity is adjusted to adapt the configuration of the sensor agent to the test data. The APM tool 110 may automatically generate an adjusted configuration and send the adjusted configuration to the sensor agent for deployment. For example, the APM tool 110 may send the adjusted configuration as a message including one or more data objects. The message may be in a data format for transmitting data objects in a client-server communication such as JavaScript Object Notation (JSON).

Figure 3:
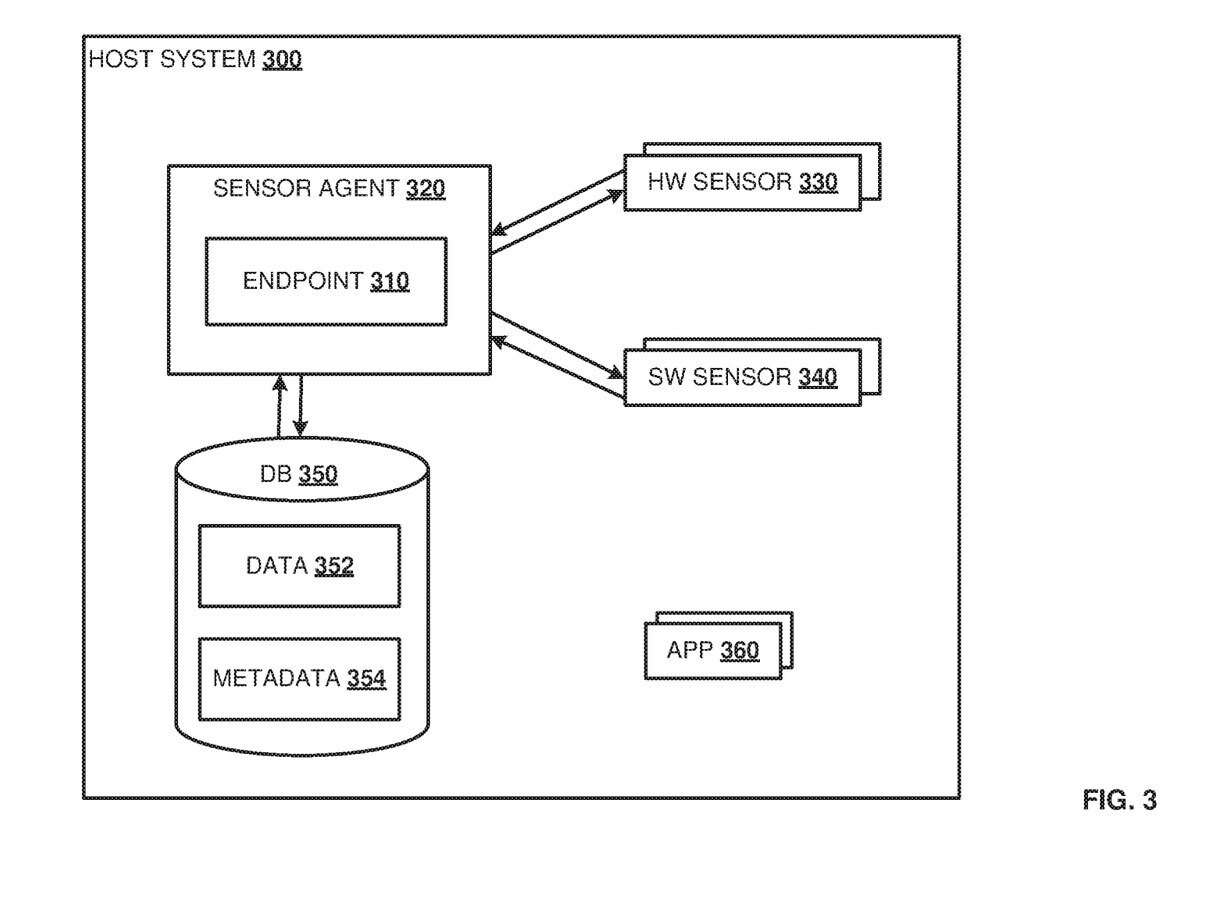
FIG. 3 is a block diagram illustrating a host system that includes a sensor agent, according to one embodiment.

FIG. 3 illustrates host system 300 that includes sensor agent 320, according to one embodiment. The host system 300 is similar to host systems 120, 130, and 140 described above with reference to FIG. 1. The host system 300 provides environment for deploying and running software tools and applications. The sensor agent 320 is deployed in the host system 300. The sensor agent 320 collects one or more system metrics for the host system 300 and for one or more applications hosted by the host system 300. For example, the sensor agent 320 may collect system metrics for application (APP) 360 that is running on the host system 300. The APP 360 may be an on-premise or cloud based application. Examples of APP 360 include but are not limited to enterprise applications such as Enterprise Resource Planning (ERP) applications, Customer Relationship Management (CRM) applications, Supplier Relationship Management (SRM) applications, Supply Chain Management (SCM) applications, and Product Lifecycle Management (PLM) applications, and other area applications (e.g., scientific, government, defense, life sciences, etc.). The APP 360 may be connected to an internal network of an organization. It should be appreciated, however, that the APP 360 may also be a third-party application providing services to users or systems in the organization through the Internet.

In one embodiment, the host system 300 includes one or more hardware (HW) sensors such as HW sensor 330. The host system 300 also includes one or more software (SW) sensors such as SW sensor 340. The HW sensor 330 measures one or more system metrics associated with performance and condition of the host system 300. For example, the HW sensor 330 may be a light sensor, a motion sensor, a temperature sensor, a tilt sensor, a moisture sensor, an acoustic or vibration sensor, a force or torque sensor, and so on. The SW sensor 340 measures one or more system metrics associated with performance of the APP 360. For example, the SW sensor 340 may measure network bandwidth, request-response cycles, CPU usage, database access times, transactions, errors, logs, and other metrics associated with performance of the APP 360. It should be appreciated that the host system 300 may also include sensors of the same type, rather than a combination of HW and SW sensors. For example, the host system 300 may include SW sensors or HW sensors.

In one embodiment, the HW sensor 330 and the SW sensor 340 are connected to the sensor agent 320. The sensor agent 320 is deployed in the host system 300 to enable communication between the host system 300 and an APM tool (not illustrated) that monitors performance of the APP

360. For example, the sensor agent 320 may provide one or more system metrics from the HW sensor 330 and/or from the SW sensor 340 to the APM tool 110, FIG. 1.

In one embodiment, the sensor agent 320 includes endpoint 310. The endpoint 310 represents a uniform resource identifier (URI) within the host system 300 where the sensor agent 320 may be accessed. Based on the endpoint 310, the sensor agent 320 may be requested from other entities on the network. In one embodiment, the endpoint 310 is preconfigured in the APM tool 110, FIG. 1. For example, the endpoint 310 may be provided to one or more APM tools when the sensor agent 320 is deployed in the host system 300.

In one embodiment, the host system 300 includes database (DB) 350. The DB 350 stores data and metadata for sensors deployed in the host system 300. For example, the DB 350 includes data 352 and metadata 354. The data 352 include system metrics captured by the HW sensor 330 and the SW sensor 340. The sensor agent 320 communicates with the DB 350 to store data and metadata from the sensors in the DB 350. The metadata 354 include types of system metrics and granularity level that may be provided by the HW sensor 330 and the SW sensor 340. Based on the metadata 354, the sensor agent 320 may generate capability information to be provided to one or more APM tools connected to the sensor agent 320. The DB 350 may be a networked storage device that is external to the host system 300. Further, the sensor agent 320 may store the data 352 and the metadata 354 within random access memory (RAM) of the host system 300 (i.e., in-memory). Alternatively, the data 352 and the metadata 354 may be stored on different storage devices and accessed by the sensor agent 320 through various communication channels.

Figure 4:
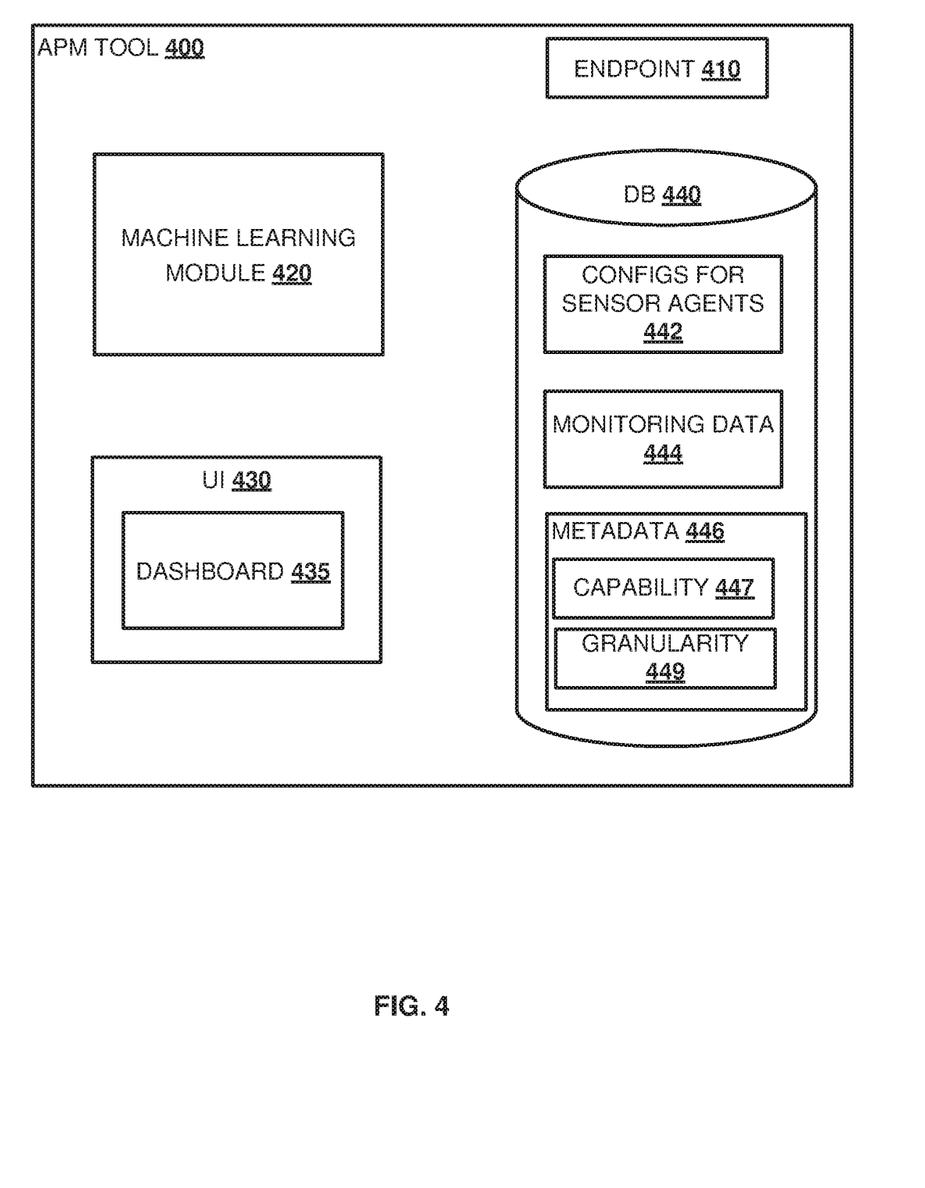
FIG. 4 is a block diagram illustrating an application performance monitoring (APM) tool, according to one embodiment.

FIG. 4 illustrates an APM tool 400, according to one embodiment. The APM tool 400 is similar to APM tool 110, FIG. 1. The APM tool 400 connects with one or more sensor agents deployed in one or more host systems. The APM tool 400 monitors condition of the one or more host systems and a number of applications running on the host systems. The APM tool 400 receives system metrics for the one or more host systems and the number of applications. Based on the system metrics, the APM tool 400 evaluates the condition of the host systems and the applications running thereon. In addition, the APM tool 400 renders the system metrics for analysis.

In one embodiment, the APM tool 400 includes endpoint 410, machine learning module 420, user interface (UI) 430, and DB 440. The endpoint 410 represents a uniform resource identifier (URI) within the APM tool 400. Based on the endpoint 410, the APM tool 400 may be requested from other entities on the network. For example, sensor agents deployed within the host systems may send system metrics to the endpoint 410 of the APM tool 400.

In one embodiment, the UI 430 can be accessed by an administrator (not illustrated) of the APM tool 400 via different types of client systems. The client systems include, but are not limited to, web browsers, voice browsers, application clients, and other software that may access, consume, and display content. The APM tool 400 provides dashboard 435 on the UI 430. System metrics evaluated by the APM tool 400 may be visually presented through the dashboard 435. The dashboard 435 is associated with the DB 440. The dashboard 435 extracts the system metrics for the host systems from the DB 440. The dashboard 435 may present the system metrics in different layouts including tables, bar charts, line charts, gauges, and so on. The dashboard 435 may display notifications, alerts, statistics, key performance indicators (KPIs), etc. for the host systems. For example, the dashboard 435 may display a notification message when the APM tool 400 determines that condition of a host system is routine. Similarly, the dashboard 435 may display an alert message when the APM tool 400 determines that condition of the host system is abnormal. In addition, the APM tool 400 may provide an opportunity for a real-time decision based on the presented system metrics and notifications/alerts.

In one embodiment, the machine learning module 420 is configured to operate in training mode and in test mode. When operating in training mode, the machine learning module 420 receives values for one or more system metrics. The values are received at the APM tool 400 from one or more sensor agents connected to the APM tool 400. For example, the values may be received from sensor agents such as the sensor agent 320, FIG. 3. The machine learning module 420 leverages a machine learning algorithm to evaluate the values and automatically identify one or more data patterns in the values. In various embodiments, the machine learning module 420 may identify data patterns based on supervised or unsupervised machine learning algorithms, artificial neural networks (ANNs), deep learning, reinforcement learning, or other machine learning techniques. The supervised machine learning algorithms may include parametric learning algorithms (e.g., "linear regression" or "support vector machines" (SVMs)) where a model structure corresponding to the machine learning algorithm and parameters to be determined through the machine learning method are predefined; or non-parametric learning algorithms (e.g., "k-nearest neighbors" or "decision trees") where a model structure corresponding to the machine learning algorithm is not defined a priori. Instead, with the non-parametric algorithms, the model structure is determined automatically by the machine learning module 420 based on the training data.

In one embodiment, the machine learning module 420 leverages a non-parametric learning algorithm to determine a model structure based on the training data. Thus, parameters that the machine learning module 420 is required to determine from the training data are not predefined. However, one or more hyperparameters may be predefined within the machine learning module 420 for the non-parametric learning algorithm. Hyperparameters represent properties that are specific to the model structure that is to be built from the training data. Hyperparameters may be preconfigured in the machine learning module 420. Hyperparameters can be referred to as rules that the machine learning module 420 adopts when building the model structure in accordance with a particular non-parametric learning algorithm and based on the training data. For example, when a model structure is built in accordance with "decision trees" learning algorithm, a value of a hyperparameter may define a rule specifying a number of data points in a single leaf of the decision tree. Similarly, the machine learning module 420 may be configured to determine one range of system metric values by setting a value of a corresponding hyperparameter "number of ranges to be determined" to one ("1"). In addition, by setting more than one hyperparameters, the machine learning module 420 may be configured to define one or more layers of values within a range of values for the system metrics.

In one embodiment, the machine learning module 420 leverages a multilayer perceptron (MLP) class of artificial neural network (ANN) to determine a model structure based on the training data. The MLP may be configured with a number of layers. For example, the MLP may be configured with three (3) layers. An input layer of the MLP includes a number of artificial neurons corresponding to the number of connected sensor agents. For example, when the APM tool 400 receives system metrics from HW sensor 330 and SW sensor 340, FIG. 3, the input layer of the MLP includes two (2) artificial neurons. In addition, an output layer of the MLP includes a number of artificial neurons corresponding to a number of output classifications to be provided by the MLP. For example, when the MLP is configured to provide 3 different classifications for the received system metrics (e.g., "routine", "suspicious", and "abnormal"), the output layer of the MLP includes 3 artificial neurons. Alternatively, the MLP may provide 3 different classifications through one artificial neuron. For example, the classification of the output of the ANN may be based on level of activation of the artificial neuron (e.g., <0.8="routine", 0.8-0.9="suspicious", >0.9="abnormal"). Moreover, the MLP includes a hidden layer with a number of nodes equal to the mean of the sizes of the input layer and the output layer—with sigmoidal activation function. In various embodiments, the number of nodes within the hidden layer may not be fixed, e.g., a set of preconfigured optional cardinal numbers of nodes may be available at start of training mode, and the number of nodes may be configured during the training mode.

In one embodiment, the machine learning module 420 determines a range of values for the system metrics based on the identified one or more data patterns. For example, the APM tool 400 may receive ten (10) values for a "CPU temperature" metric from the sensor agent 320. The sensor agent 320 provides system metrics for the host system 300, FIG. 3. Example values may be "65", "60.2", "51", "79", "86", "57", "72", "95", "81", and "68". The unit of measure may be "degrees Celsius", "degrees Fahrenheit", or other unit of measure suitable for describing temperature. Upon evaluation, the machine learning module 420 detects that the values vary between "51" and "95". Thus, the machine learning module 420 determines a range of values "51-95" for the "CPU temperature" metric.

In one embodiment, the machine learning module 420 further defines a number of layers within the range of values. For example, value of a hyperparameter "number of layers within a range" may be set to two ("2"). Thus, the range of values is divided into two layers. For example, the first layer may include values that are closer to an average value calculated based on the received values (i.e., average value of the received values for the "CPU temperature" is "71.4"), and the second layer may include values that are closer to minimum or maximum values in the range of values (i.e., the minimum value of the range of values is "51" and the maximum value is "95"). Different mathematical methods may be employed to calculate distance between the values. In one embodiment, the values are applied on a linear scale as data points. Calculation of the distance between the values is based on known methods for calculating distance between data points such as Euclidean distance and Manhattan distance.

In one embodiment, the machine learning module 420 is configured to operate in training mode for a predefined interval of time. The predefined interval of time may be smaller (e.g., 24 hours) when a landscape to be monitored is small (e.g., two to three host systems). The predefined interval of time may be bigger (e.g., 168 hours) when the landscape to be monitored includes ten to twenty host systems. When the period expires, the machine learning module 420 switches to test mode. Optionally, the machine learning module 420 may be configured to switch between training mode and test mode multiple times, ensuring that the generated model structure of the machine learning module 420 is regularly updated with up-to-date samples of training data. The update of the training data samples may affect the defined range and layers of values. When operating in test mode, the machine learning module 420 receives values of one or more system metrics and tests the values in accordance with the model structure generated from the training mode. The machine learning module 420 tests whether the values fall within one or more layers defined for the one or more system metrics. For example, the machine learning module 420 compares received values for the "CPU temperature" metric with the range of values determined based on the training data. Based on the comparison, the machine learning module 420 provides an output to the APM tool 400. The output from the machine learning module 420 may declare that the tested value is outside the defined range of values, or the tested value falls in the first/second layer of values within the range of values.

In one embodiment, the APM tool 400 is configured to classify the output received from the machine learning module 420. Based on the classification, the APM tool 400 may determine condition of the host system 300 and one or more applications running in the host system 300. For example, when the output from the machine learning module 420 declares that the tested value (e.g., "99") is outside the defined range of values, the APM tool 400 determines that the condition of the host system 300 is "abnormal". Further, when the output from the machine learning module 420 declares that the tested value is within the range of values and falls in the first layer of values, the APM tool 400 determines that the condition of the host system 300 is "routine". Additionally, when the output from the machine learning module 420 declares that the tested value is within the range of values and falls in the second layer of values, the APM tool 400 determines that the condition of the host system 200 is "suspicious".

In one embodiment, the APM tool 400 integrates with one or more sensor agents in a landscape of heterogeneous systems. For example, the APM tool 400 may integrate with the host systems 120, 130, and 140 from landscape 100, FIG. 1. The APM tool 400 requests capability information from the one or more sensor agents in the landscape. Network addresses for accessing the sensor agents may be preconfigured in the APM tool 400. Alternatively, sensor agents that are deployed in host systems within the landscape may automatically register with the APM tool 400 and provide corresponding resource identifiers. The capability information includes types of system metrics that the sensor agents are configured to provide. In addition, the capability information includes a highest granularity level for the system metrics. The highest level of granularity determines an ultimate level of detail that may be captured for a system metric. The capability information is based on types of sensors attached to the sensor agent at a corresponding host system.

In one embodiment, the APM tool 400 stores the capability information as metadata 446 in the DB 440. The metadata 446 includes capability 447 metadata and granularity 449 metadata. The capability 447 metadata includes types of system metrics that the sensor agents are capable of providing. The granularity 449 metadata includes a highest level of granularity that may be provided for a type of system metric from the capability 447 metadata.

In one embodiment, the APM tool 400 generates configuration of the sensor agents based on the capability information for the sensor agents. Configuration for a sensor agent includes one or more system metrics to be provided by the sensor agent, and corresponding granularities one or more system metrics. The APM tool 400 automatically generates and sends configurations to the sensor agents based on the received capability information. The APM tool 400 stores the configurations for the sensor agents as configurations (configs) for sensor agents 442 within the DB 440. The configs for sensor agents 442 store the most recent configuration sent to the sensor agents.

In one embodiment, the APM tool 400 requests additional test data, when condition of a monitored system or application is classified as "suspicious". The APM tool 400 adapts the configuration of the sensor agents based on classification of the output from the machine learning module 420. The APM tool 400 generates, automatically and without manual intervention, an adjusted configuration for a sensor agent that provides system metrics for the monitored system or application. The adjusted configuration prevails the configuration of the sensor agent. The adjusted configuration for the sensor agent may include different level of granularity for the system metric. For example, the adjusted configuration may configure the sensor agent to provide values for the system metric on 5 seconds, instead of 30 seconds. The APM tool 400 sends the adjusted configuration to the sensor agent for deployment. Further, the APM tool 400 replaces the configuration with the adjusted configuration for the sensor agent within configs for sensor agents 442.

In one embodiment, the APM tool 400 is configured to replace the adjusted configuration with the default configuration of the sensor agent, when newly received system metrics are again classified as "routine" instead of "suspicious".

In one embodiment, the DB 440 includes monitoring data 444. The monitoring data 444 stores values for system metrics that are received from the sensor agents. Values from the monitoring data 444 may be tested by the machine learning module 420. In addition, the values from the monitoring data 444 may be rendered for analysis on the dashboard 435.

Figure 5A:
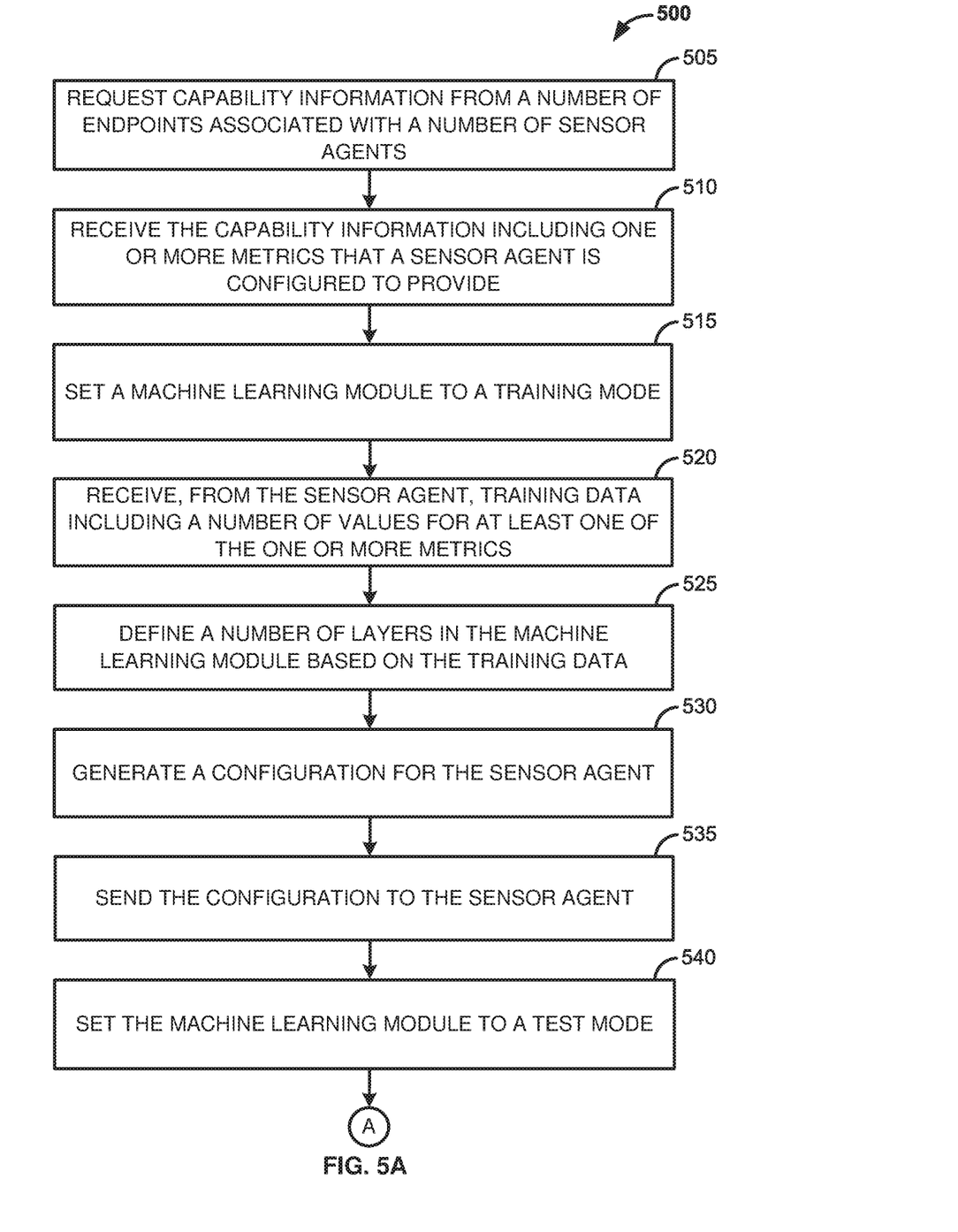
FIGS. 5A-5B are flow diagrams illustrating a process to discover capability of a sensor agent and adaptively configure the sensor agent, according to one embodiment.
Figure 5B:
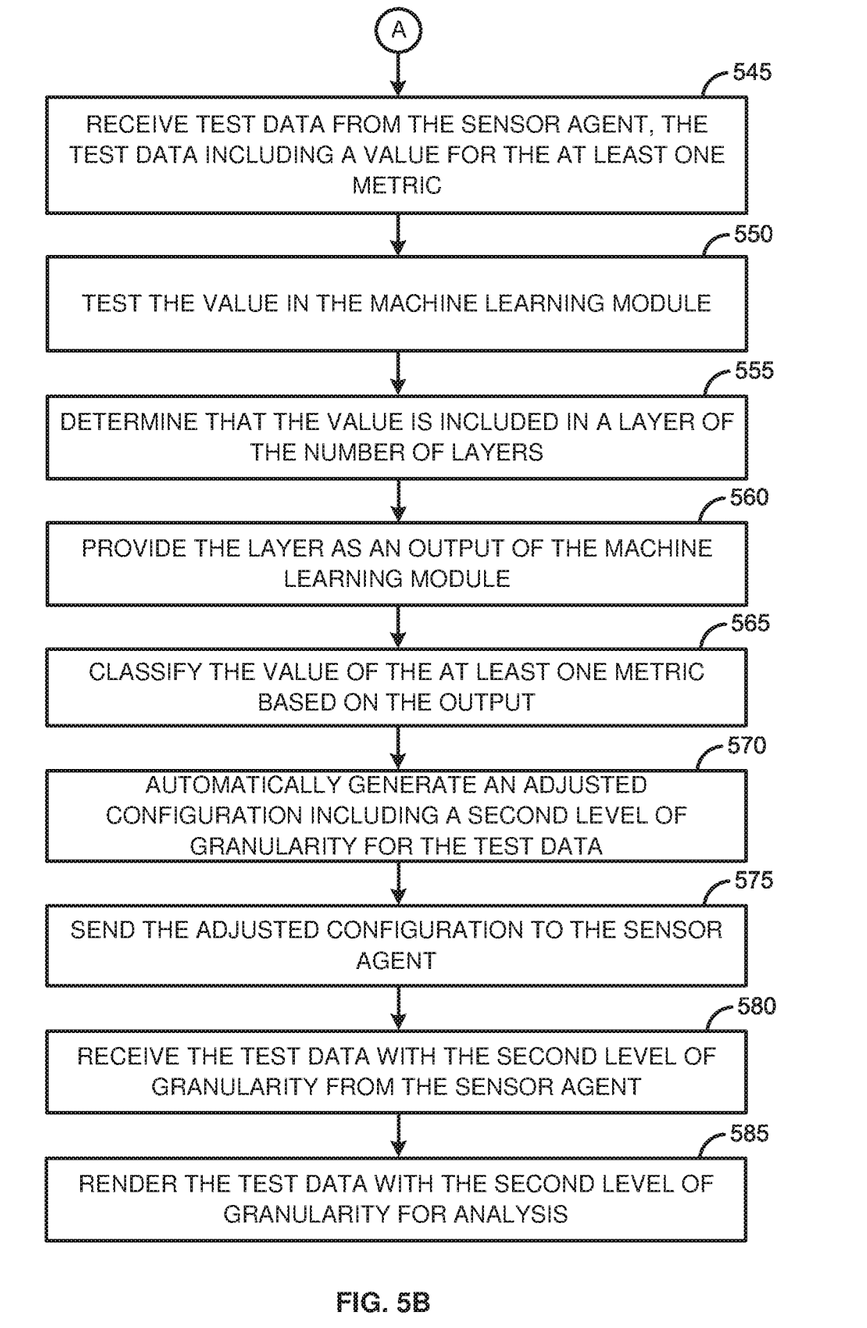

FIGS. 5A-5B are flow diagrams illustrating a process 500 to discover capability of a sensor agent and adaptively configure the sensor agent, according to one embodiment. At 505 (FIG. 5A), an APM tool requests capability information from a number of endpoints. For example, the APM tool 400, FIG. 4 may request the capability information. The number of endpoints corresponds to a number of sensor agents. The number of endpoints represents URIs of the number of sensor agents within a number of heterogeneous host systems. At 510, the capability information is received at the APM tool. The capability information includes one or more system metrics that a sensor agent is configured to provide. Sensor metrics provided by the sensor agent depend on types of sensors connected to the sensor agent at a corresponding host system.

In one embodiment, the one or more metrics are tested by a machine learning module of the APM tool. At 515, the machine learning module is set to a training mode. In training mode, the machine learning module evaluates system metrics and generates a model structure based on the training data. At 520, training data is received from the sensor agent. The training data includes a number of values for at least one of the one or more metrics. The machine learning module evaluates and tests the system metrics in accordance with a machine learning algorithm. Based on the training data, at 525, a number of layers is defined in the machine learning module. A layer of the number of layers includes one or more values of the number of values.

At 530, a configuration for the sensor agent is generated based on the capability information and the training data. The configuration includes types of system metrics to be provided by the sensor agent and granularity levels for the system metrics. At 535, the configuration is sent to the sensor agent. At 540, the machine learning module is set to test mode. For example, the machine learning module may work in training mode for a predefined interval of time. When this period expires, the machine learning module may automatically switch to test mode.

At 545 (FIG. 5B), the machine learning module receives test data from the sensor agent. The test data includes a value for the at least one metric. At 550, the value is tested in the machine learning module. In one embodiment, the machine learning module tests the value in accordance with the model structure generated in the training mode. At 555, it is determined that the test value is included in a layer of the number of layers. The layer is provided, at 560, as an output from the machine learning module. At 565, the value of the at least one metric is classified based on the output. In one embodiment, the value is classified as "suspicious". For example, the value may be classified as "suspicious", when the corresponding layer is defined to include values that are close to min/max values observed in the training mode.

In one embodiment, the APM tool adaptively adjusts configuration of the sensor agent to request more data, when the output of the machine learning module is classified as "suspicious". Thus, at 570, an adjusted configuration is generated for the sensor agent. The adjusted configuration includes a second level of granularity for the test data. At 575, the adjusted configuration is sent to the sensor agent for deployment.

Based on the adjusted configuration, at 580, test data with the second level of granularity is received at the APM tool. Further, at 585, the test data with the second level of granularity is rendered for analysis. For example, the test data with the second level of granularity may be displayed on a dashboard in accordance with various layouts including tables, gauges, charts, and so on.

Figure 6:
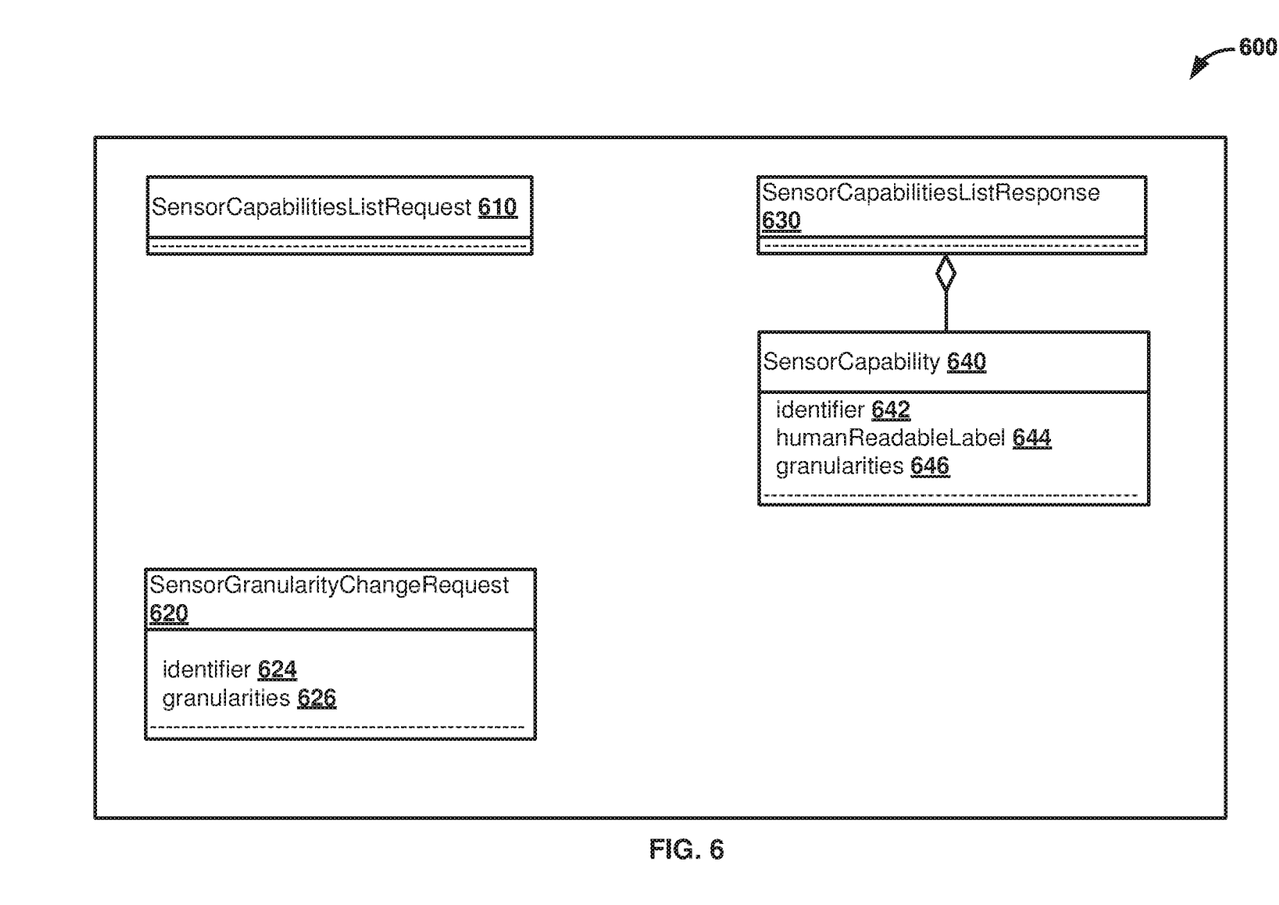
FIG. 6 is a unified modelling language (UML) class diagram illustrating a communication protocol model, according to one embodiment.

FIG. 6 is a UML class diagram 600 illustrating a model of a network protocol for discovering capability and adaptive configuration of sensor agents, according to one embodiment. The UML class diagram 600 graphically represents a static view of the model of the network protocol. The UML class diagram 600 includes class "SensorCapabilitiesListRequest" 610, class "SensorGranularityChangeRequest" 620, class "SensorCapabilitiesListResponse" 630, and class "SensorCapability" 640. For example, the APM tool 400. FIG. 4 may request capability information from sensor agents by instantiating the class "SensorCapabilitiesListRequest" 610. Similarly, the APM tool 400 may receive the capability information when the class "SensorCapabilitiesListResponse" 630 is instantiated, and may adaptively adjust granularity of a system metric by instantiating the class "SensorGranularityChangeRequest" 620.

In one embodiment, the class "SensorCapabilitiesListResponse" 630 is derived from the class "SensorCapability" 640. Class "SensorCapabilitiesListResponse" 630 inherits attributes of the class "SensorCapability" 640. The class "SensorCapability" 640 has attributes "identifier" 642, "humanReadableLabel" 644, and "granularities" 646. The attributes of the class "SensorCapability" 640 define data to be included in instances of the class "SensorCapability" 640 and the class "SensorCapabilitiesListResponse" 630. In addition, the class "SensorGranularityChangeRequest" 620 has attributes "identifier" 624 and "granularities" 626. Moreover, the network protocol may include a class for requesting monitoring data (not illustrated) and a class for providing the monitoring data (not illustrated).

APM is performed by APM tools that deploy agents on systems within a network to monitor the systems and applications running thereon. Nevertheless, APM tools provide different insight based on employed technologies. Also, different APM tools deploy dedicated agents to monitor the systems. In such cases, effective monitoring of heterogeneous systems requires deployment of a number of APM tools and, consequentially, deployment of a number of agents within a monitored system. Thus, users are often limited to a restricted number of APM tools and cannot flexibly combine available solutions to achieve optimal total cost of ownership (TCO). At least some of the technologies described herein address these problems by providing a network protocol that enables APM tools to integrate with various sensor agents by discovering capabilities of the sensor agents and adaptively monitor system metrics provided by the sensor agents. This way, by leveraging the network protocol, an APM tool may automatically discover topology of heterogeneous systems, discover capabilities of connected sensor agents, configure types and granularities of system metrics to be received, detect "suspicious" behavior of monitored systems, and adaptively preconfigure granularities of system metrics based on an output from a machine learning module to acquire more detailed monitoring data for analysis and error tracing when an abnormal condition within the heterogeneous system occurs.

As another example, a HW sensor may be configured by an APM tool to send "CPU temperature" metrics to the APM tool according to a defined period of thirty (30) seconds. When the APM tool receives value "90" degrees Celsius for the "CPU temperature" metric, the APM tool may classify the value as either "routine" or "abnormal" based on configuration of the APM tool. Based on the classification, the APM tool may alert an administrator for the "abnormal" condition. However, temperature of the CPU system may vary in significant ranges within the defined period of 30 seconds. Thus, the classification of the value may be inaccurate. The present disclosure addresses these problems by enabling the APM tool to classify values of the "CPU temperature" metric as "suspicious" when the values are between 90 and 95 degrees Celsius, and classify values of the "CPU temperature" metric as "abnormal", when the values are above 95 degrees Celsius. When the APM tool receives value "90" degrees Celsius for the "CPU temperature" metric, the APM tool adaptively re-configures the period for receiving of "CPU temperature" metrics to five (5) seconds. Consequentially, when the APM tool receives values for the "CPU temperature" metric according to the newly define period of 5 seconds, the APM tool may determine variation of the "CPU temperature" metric within a range of 90-97 degrees Celsius. Therefore, based on the recently received values for the "CPU temperature" metrics, the APM tool may classify the temperature of the CPU as "abnormal" and send an alert to a system administrator. Additionally, the APM tool may dynamically redistribute system load among more host systems to reduce CPU temperature of the host system.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system that causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java® programming language, C++, or other object-oriented programming language and development tools. Another embodiment may be implemented in hard-wired circuitry in place of, or in combination with machine readable software instructions.

Figure 7:
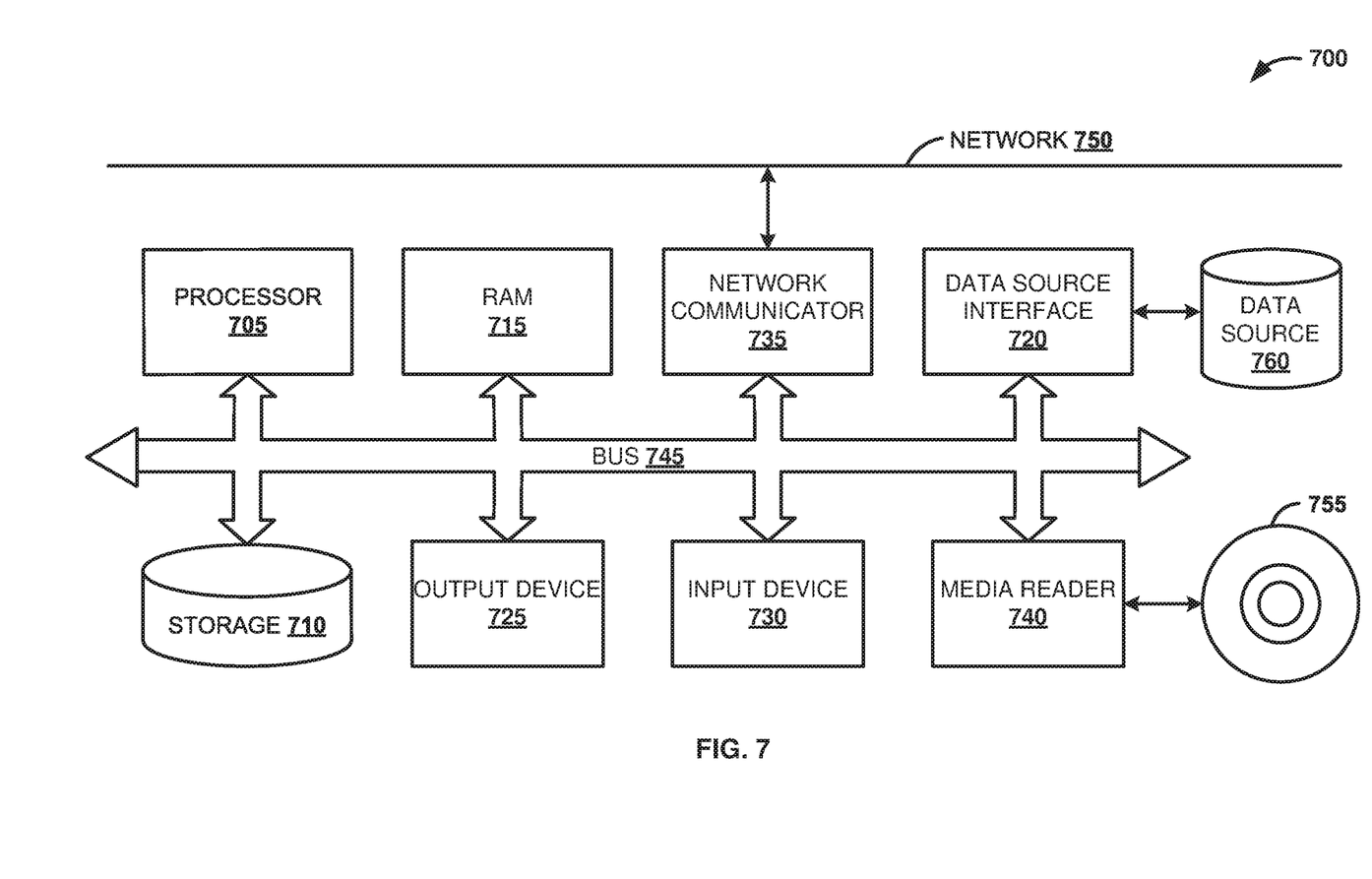
FIG. 7 is block diagram of an exemplary computer system, according to one embodiment.

FIG. 7 is a block diagram of an exemplary computer system 700. The computer system 700 includes a processor 705 that executes software instructions or code stored on a computer readable storage medium 755 to perform the above-illustrated methods. The processor 705 may include a plurality of cores. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. According to some embodiments, such as some in-memory computing system embodiments, the RAM 715 may have sufficient storage capacity to store much of the data required for processing in the RAM 715 instead of in the storage 710. In some embodiments, the data required for processing may be stored in the RAM 715. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the outputs of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments, the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, that are to be interpreted in accordance with established doctrines of claim construction.

What is claimed is:

1. A computer implemented method to adaptively monitor applications, the method comprising:
   receiving capability information comprising one or more metrics that a sensor agent is configured to provide;
   receiving test data from the sensor agent, wherein the test data comprises a value of at least one metric of the one or more metrics, and wherein the sensor agent is configured in accordance with a configuration comprising a first level of granularity for the test data;
   testing the value of the at least one metric in a machine learning module;
   classifying the value of the at least one metric based on an output from the machine learning module; and
   automatically adjusting the first level of granularity to adapt the configuration of the sensor agent to the test data based on how close the value of the at least one metric is to minimum or maximum values of a range of values for the at least one metric.

2. The method of claim 1, further comprising:
   requesting the capability information from a plurality of endpoints associated with a plurality of sensor agents, wherein an endpoint of the plurality of endpoints represents a network path for accessing the sensor agent in a host system.

3. The method of claim 2, further comprising:
   generating the capability information based on one or more sensors deployed in the host system, wherein the one or more sensors are associated with the one or more metrics.

4. The method of claim 1, further comprising:
   setting the machine learning module to a training mode;
   receiving, from the sensor agent, training data comprising a plurality of values for the at least one metric; and
   defining a plurality of layers in the machine learning module based on the training data, wherein a layer of the plurality of layers comprises one or more values of the plurality of values.

5. The method of claim 1, further comprising:
   generating the configuration for the sensor agent; and
   sending the configuration to the sensor agent.

6. The method of claim 1, wherein testing the value of the at least one metric further comprises:
   setting the machine learning module to a test mode.

7. The method of claim 1, wherein classifying the value of the at least one metric further comprises:
   determining that the value of the at least one metric is included in a layer of a plurality of layers defined within the machine learning module; and
   providing the layer as the output of the machine learning module.

8. The method of claim 1, further comprising:
   generating an adjusted configuration for the sensor agent, wherein the adjusted configuration comprises a second level of granularity for the test data;
   sending the adjusted configuration to the sensor agent;
   receiving the test data with the second level of granularity from the sensor agent; and
   rendering the test data with the second level of granularity for analysis.

9. A computer system to securely store data objects, the system comprising:
   a processor; and a memory in association with the processor storing instructions related to:

receiving capability information comprising one or more metrics that a sensor agent is configured to provide;

receiving test data from the sensor agent, wherein the test data comprises a value of at least one metric of the one or more metrics, and wherein the sensor agent is configured in accordance with a configuration comprising a first level of granularity for the test data;

testing the value of the at least one metric in a machine learning module;

classifying the value of the at least one metric based on an output from the machine learning module; and automatically adjusting the first level of granularity to adapt the configuration of the sensor agent to the test data based on how close the value of the at least one metric is to minimum or maximum values of a range of values for the at least one metric.

10. The computer system of claim 9, wherein the instructions further comprising:

requesting the capability information from a plurality of endpoints associated with a plurality of sensor agents, wherein an endpoint of the plurality of endpoints represents a network path for accessing the sensor agent in a host system.

11. The computer system of claim 9, wherein the instructions further comprising:

setting the machine learning module to a training mode;

receiving, from the sensor agent, training data comprising a plurality of values for the at least one metric; and defining a plurality of layers in the machine learning module based on the training data, wherein a layer of the plurality of layers comprises one or more values of the plurality of values.

12. The computer system of claim 9, wherein the instructions further comprising:

generating the configuration for the sensor agent; and sending the configuration to the sensor agent.

13. The computer system of claim 9, wherein the instructions further comprising:

setting the machine learning module to a test mode;

determining that the value of the at least one metric is included in a layer of a plurality of layers defined within the machine learning module; and providing the layer as the output of the machine learning module.

14. The computer system of claim 9, wherein the instructions further comprising:

generating an adjusted configuration for the sensor agent, wherein the adjusted configuration comprises a second level of granularity for the test data;

sending the adjusted configuration to the sensor agent;

receiving the test data with the second level of granularity from the sensor agent; and rendering the test data with the second level of granularity for analysis.

15. A non-transitory computer readable medium storing instructions which when executed by at least processor cause a computer system to perform operations comprising:

receive capability information comprising one or more metrics that a sensor agent is configured to provide;

receive test data from the sensor agent, wherein the test data comprises a value of at least one metric of the one or more metrics, and wherein the sensor agent is configured in accordance with an initial configuration comprising a first level of granularity for the test data;

test the value of the at least one metric in a machine learning module;

classify the value of the at least one metric based on an output from the machine learning module; and automatically adjust the first level of granularity to adapt the configuration of the sensor agent to the test data based on how close the value of the at least one metric is to minimum or maximum values of a range of values for the at least one metric.

16. The computer readable medium of claim 15, wherein the operations further comprising:

request the capability information from a plurality of endpoints associated with a plurality of sensor agents, wherein an endpoint of the plurality of endpoints represents a network path for accessing the sensor agent in a host system.

17. The computer readable medium of claim 15, wherein the operations further comprising:

set the machine learning module to a training mode;

receive, from the sensor agent, training data comprising a plurality of values for the at least one metric; and define a plurality of layers in the machine learning module based on the training data, wherein a layer of the plurality of layers comprises one or more values of the plurality of values.

18. The computer readable medium of claim 15, wherein the operations further comprising:

generate the configuration for the sensor agent; and send the configuration to the sensor agent.

19. The computer readable medium of claim 15, wherein the operations further comprising:

set the machine learning module to a test mode;

determine that the value of the at least one metric is included in a layer of a plurality of layers defined within the machine learning module; and provide the layer as the output of the machine learning module.

20. The computer readable medium of claim 15, wherein the operations further comprising:

generate an adjusted configuration for the sensor agent, wherein the adjusted configuration comprises a second level of granularity for the test data;

send the adjusted configuration to the sensor agent;

receive the test data with the second level of granularity from the sensor agent; and render the test data with the second level of granularity for analysis.

* * * * *